United States Patent Office 3,237,091
Patented Feb. 22, 1966

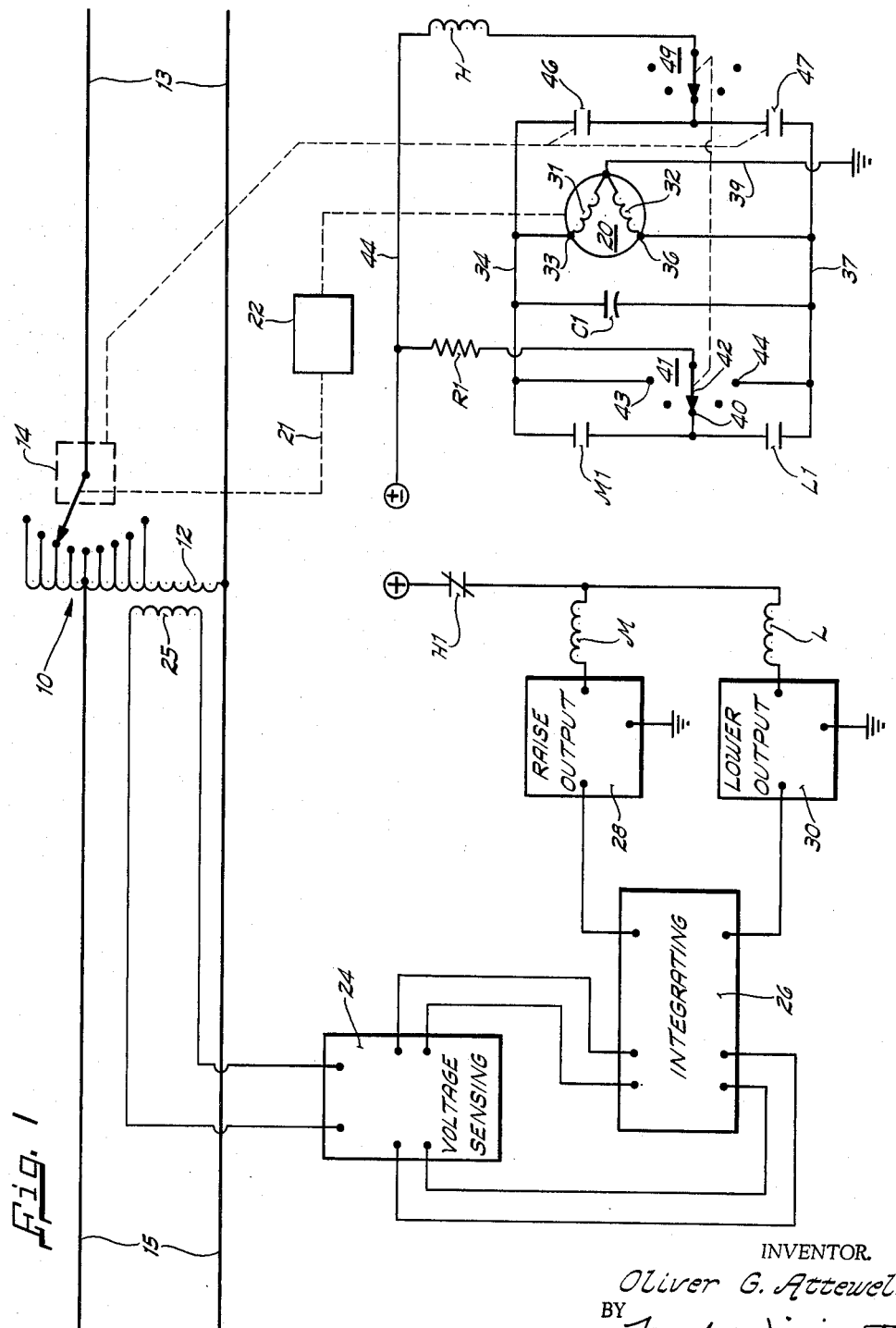

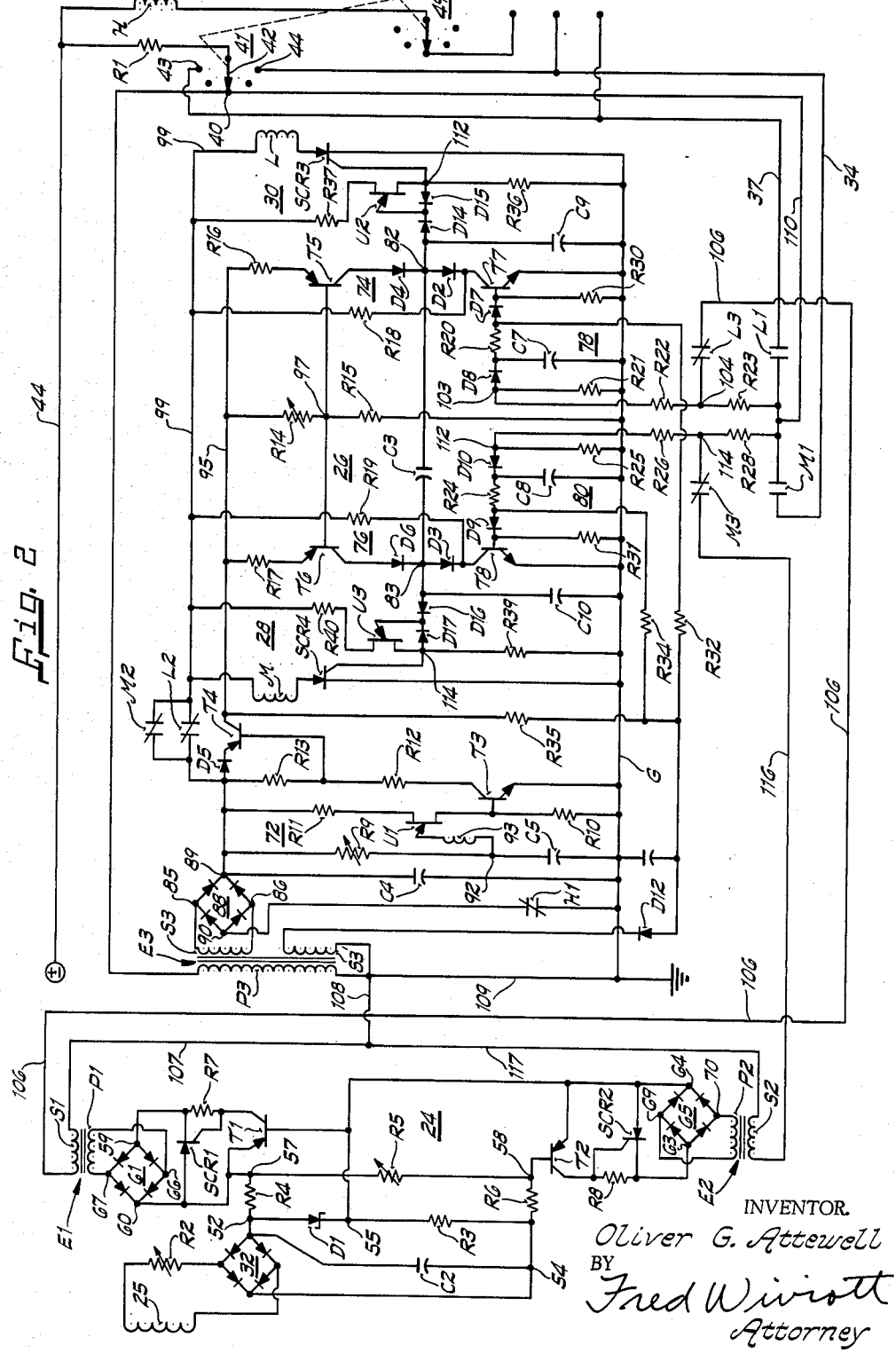

3,237,091
VOLTAGE MAGNITUDE CONTROL SYSTEM
Oliver G. Attewell, South Milwaukee, Wis., assignor to McGraw-Edison Company, Milwaukee, Wis., a corporation of Delaware
Filed Sept. 17, 1962, Ser. No. 224,181
17 Claims. (Cl. 323—43.5)

This invention relates to control circuits and more particularly to a circuit for controlling the tap changing motor of a voltage regulator.

Tap changing voltage regulators are devices operative to maintain the voltage of a load circuit within a prescribed band or upper and lower voltage limits. Should the load voltage deviate from within the band limits, a tap switch is actuated by a tap changing motor increase or decrease the number of turns in a voltage regulator winding to thereby return the load voltage to within the desired limits. The control for such tap changing motors includes a voltage sending means, timing means to insure that transient conditions do not cause a tap changing operation and output means operative to actuate the tap changing motor in a voltage correcting direction when such deviations persist for a predetermined interval.

It is an object of the invention to provide a new and improved control circuit for the tap changing motor or a voltage regulating transformer.

Another object of the invention is to provide a voltage regulating device having an integrating energy storage means which is charged in a first sense through a first terminal when the regulated voltage rises above preselected limits and which is charged in an opposite sense through the other terminal when the regulated voltage falls below such limits and output means operable to lower the regulated voltage when the charge on one terminal reaches a predetermined value and operable to raise the regulated voltage when the charge on the other terminal reaches a predetermined value. Another object is to provide such a device with circuit means for discharging the energy storage means when the regulated voltage returns to the preselected limits. Yet another object is to provide such a device wherein said charging and discharging rates are substantially constant.

A further object is to provide such a voltage regulating device wherein the energy storage means is a capacitor.

A still further object is to provide such a regulating device wherein a switching circuit is connected to each of the terminals and is operative to initiate the charging of the storage device through one terminal when the regulated voltage rises above preselected limits and through the other terminal when the regulated voltage falls below such limits.

These and other objects and advantages of the instant invention will become more apparent from the detailed description thereof taken with the accompanying drawings in which:

FIG. 1 is a schematic diagram of a voltage regulating device incorporating the instant invention; and FIG. 2 is a circuit diagram showing the control circuit according to the instant invention in greater detail.

Referring now to the drawings in greater detail, FIG. 1 shows a voltage regulator indicated generally by the reference numeral 10 and which is provided with an autotransformer 12 connected to a power line 13 through a suitable tap changer 14 and to a load line 15. The tap changer 14 is driven by a motor 20 having an output shaft 21 which is connected to the tap changer 14 through a suitable gear reduction mechanism 22. Motor 20 may be of any convenient type such as a reversible two winding induction motor with capacitance start.

The tap changer 14 is merely schematically illustrated since the details thereof form no part of the instant invention, it being understood that any suitable well-known tap changer may be utilized. It will be further understood that while the invention is illustrated and described with respect to the control of a voltage regulator, it may also be employed in other types of electrical apparatus such as capacitor switches and the like.

In general, the control circuit for initiating the operation of the tap changing motor 20 includes, as shown in FIG. 1, a voltage sensing portion 24 coupled to the load line 15 by means of a winding 25 which is inductively coupled to the autotransformer 12 and which senses the voltage in the load line 15. The control circuit also includes an integrating portion 26 connected to the voltage sensing portion 24, a raise output portion 28 and a lower output portion 30.

The voltage sensing portion 24 is operable to produce a raise signal when the voltage in load line 15 falls below the band limits and a lower signal when the load voltage rises above the band limits. Because transient conditions in load line 15 may cause momentary deviations of the load voltage from within the band, the integrating portion 26 is operable to directionally integrate the raise or lower signals from the voltage sensing portion 24 and to produce a raise signal to the raise output portion 28 or a lower signal to the lower output portion 30 should the output signal of the voltage sensing portion continue for a predetermined length of time. The motor 20 has a raise winding 31 and a lower winding 32.

Upon the receipt of a raise output signal from the integrating portion 26, the raise output portion 28 is operable to energize a relay M which, in turn, closes contacts M1 to complete an energizing circuit through the raise winding 31 of the motor 20. Similarly, the lower output portion 30 is operable upon the receipt of a lower output signal from the integrating portion 26 to energize a relay L which closes contacts L1 to complete an energizing circuit through the lower winding 32 of motor 20.

More specifically, the motor 20 is shown to have a terminal 33 which connects one end of the raise winding 31 to a conductor 34, a second terminal 36 which connects one side of the lower widing 32 to a conductor 37 and a conductor 39 which connects the other side of each of the windings 31 and 32 to ground. Contacts M1 of relay M are disposed in conductor 34 between the raise motor terminal 33 and the automatic tap 40 of a selector switch 41 whose wiper 42 is connected to an alternating current source 44 through a current limiting resistor R1. Holding switch contacts 46 and 47, which are coupled to the tap changer 14 and closable during a tap change operation, are in circuit between the conductors 34 and 37 respectively and a tap switch 49 mechanically connected to the selector switch 42 and in circuit with alternating current source 44 through the coil of a relay H. This insures that the motor 20 will remain energized once a tap change has begun and until the completion thereof. Also, the closing of holding contacts 46 or 47 energizes relay H which opens normally closed contacts H1 in circuit with the relay windings M and L so that these relays will become reset after the initiation of a tap changing operation. Once the tap change has completed, however, holding contacts 46 and 47 will open to de-energize relay H so that contacts H1 will all reclose so that the control circuit can perform further tap changes should the initial tap change not bring the load voltage within the band limits.

The voltage sensing circuit 24 is shown in greater detail in FIG. 2 to include a capacitor C2 which is coupled to the voltage sensing winding 25 through a full wave rectifier 32 and a voltage dropping resistor R2. The series combination of a Zener diode D1 and a resistor R3 are connected across the terminals 52 and 54 of the capacitor C2. Because the voltage drop across D1 will at all times be equal to its Zener voltage, the potential at junction point 55 between diode D1 and resistor R3 will be equal to the voltage across capicitor C2 minus the Zener voltage of D1. Hence, because the Zener voltage of D1 remains constant it can be seen that the potential at junction point 55 will change through the same number of volts as the positive terminal 54 of capacitor C2, whose voltage in turn is proportional to the voltage in the load line 15.

A resistor string consisting of resistors R4, R5 and R6 are also connected across the capacitor terminals 52 and 54. It will be appreciated that the potentials at the junction points 57 and 58, between resistors R4 and R5 and between resistors R5 and R6, respectively, vary in direct proportion to changes in the voltage across capacitor C2. The resistance of R4 is much larger than that of R5 or R6 so that the voltage drop across R4 will be substantially the entire applied voltage. As a result, changes in the potential at junction points 57 and 58 will be only a small fraction of the total change in the voltage across capacitor C1. In this manner, a pair of voltage signals are produced at junction points 57 and 58 whose values are different from each other and which are substantially fixed with respect to the potential at junction point 55.

The voltage sensing portion 24 also includes a first PNP type transistor T1 whose base and emitter are respectively connected to junction points 55 and 57 and a second PNP type transistor T2 whose emitter and base are connected to the junction points 55 and 58. In addition, the emitter and collector of T1 are respectively connected to the anode and gate of a silicon controlled rectifier SCR1 and the emitter and collector of T2 are respectively connected to the anode and gate of the second silicon controlled rectifier SCR2.

The anode and cathode of SCR1 are connected across the output terminals 59 and 60 of a full wave rectifier 61 and the anode and cathode of SCR2 are connected across the output terminals 63 and 64 of a full wave rectifier 65.

Resistors R6 and R7 are inserted between the cathode and gate of SCR1 and SCR2, respectively, to provide a path for leakage current from the anode to the gate without going through the cathode.

For a more detailed description of the voltage sensing circuit just described, reference is made to application Serial No. 149,442, filed November 1, 1961, and assigned to the assignee of the instant application.

The input terminals 66 and 67 of full wave rectifier 61 is connected to the primary winding P1 of a transformer E1 and the input terminals 69 and 70 of full wave rectifier 65 is connected to primary winding P2 of a second transformer E2. The secondary windings S1 and S2 of transformers E1 and E2, respectively, are connected to the integrating circuit 26.

The integrating circuit 26 includes a pulse generating circuit 72, a first constant current circuit 74, a second constant current circuit 76, an integrating of capacitor C3, a first switching circuit 78 and a second switching circuit 80.

The pulse generating circuit 72 is operative to produce periodic recurring voltage impulses to the constant current circuits 74 and 76. The constant current circuits are each coupled to a different side of the capacitor C3 and each is operative upon receipt of the voltage impulses to provide constant output current pulses to the terminals 82 and 83 of integrating capacitor C3. When the load voltage is within the band, the switching circuits 78 and 80 prevent the integrating capacitor C3 from charging by coupling the terminals 82 and 83, respectively, to ground. When a voltage lower signal is received from the voltage sensing portion 24, switching circuit 78 opens so that integrating capacitor C3 begins charging in a first sense through the terminal 82. Similarly, if a voltage raise signal is received from the voltage sensing portion 24, switching circuit 80 will open so that integrating capacitor C3 will begin charging in an opposite sense through the terminal 83. Diode D2 between terminal 82 in the switching circuit 78 and diode D3 between the terminal 83 and switching circuit 80 allow capacitor C3 to discharge at the same rate it had been charging should either the raise or lower signal from the voltage sensing circuit 24 cease prior to a tap change, indicating that the load voltage has returned to band.

Operating energy is supplied to the integrating circuit 26 as well as the raise output circuit 28 and the lower output circuit 80 by a transformer E3 having a primary winding P3 in circuit with the selector switch 40 between the alternating current source 44 and ground. One secondary winding S3 of transformer E3 is connected across the input terminals 85 and 86 of a full wave rectifier 88.

A capacitor C5 and a resistor R9 are series connected across the output terminals 89 and 90 of full wave rectifier 88. As a result, capacitor C5 will charge exponentially at a rate controlled by the adjustment of R9, as long as current appears at the output terminals 89 and 90. The junction 92 between C5 and R9 is connected to the emitter of a unijunction transistor U1 through an inductor 93.

A unijunction transistor is a solid state electronic device having an emitter electrode, a base-one electrode and a base-two electrode. Such devices are characterized by a very high input impedance to the emitter-base-one circuit when the emitter voltage is below approximately one half the voltage between base-two and base-one. If the emitter voltage is raised above a value equal to approximately one half the supply voltage, the unijunction transistor will break down and conduct current from the emitter to base-one.

The base-one of unijunction transistor U1 is connected to the junction between the base of an NPN transistor T3 and a resistor R10, the latter of which is also connected to ground bus G. The base-two of U1 is connected to output terminal 89 of rectifier 88 through resistor R11. The emitter of transistor T3 is connected to the ground bus G and its collector is connected to the base of a PNP transistor T4 through a resistor R12. The emitter of T4 is connected to terminal 89 through a diode D5 and its base is connected to terminal 89 through resistor R13. The emitter of T4 is connected to the constant current circuits 74 and 76 through conductor 95.

In operation of the pulse generating circuit 72, capacitor C5 will be charged by the current flowing in the output terminals 89 and 90 of full wave rectifier 88. When the potential at junction point 92 reaches a predetermined value, unijunction transistor U1 will break down conducting emitter-base-one current to the base of T3. As a result of the drop across resistor R10, the potential on the base of transistor T3 will become more positive than its emitter potential so that collector current will be drawn through R12 and R13. This makes the base of T4 less positive than its emitter and T4 will also become conductive. Unijunction transistor U1 will remain fired until capacitor C5 is completely discharged so that transistors T3 and T4 will remain conductive for this interval. After capacitor C5 has discharged through U1 and R10, unijunction transistor U1 will turn off so that transistors T3 and T4 become nonconductive. It can be seen, therefore, that the frequency and duration of the current pulses delivered from transistor T4 to conductor 95 will depend upon the charging and discharging rate of capacitor C5. The charging rate of C5, and hence, the interval between pulses will be determined by the resistance of R9 and the discharging time, and hence, the length of each of the current pulses will be determined by the resistance of R10 and the inductance of inductor 93.

Referring again to the constant current circuits 74 and 76, each is shown to include a PNP transistor T5 and T6, respectively, whose bases are each connected to the junction 97 of a voltage divider consisting of a first resistor R14 connected to conductor 95 and a second resistor R15 connected to the ground bus G. The emitter of T5 is connected to conductor 95 through resistor R16 and its collector is connected through diode D4 to the terminal 82 of capacitor C3. Similarly, the emitter of T6 is connected to conductor 95 through resistor R17 and its collector is connected through diode D6 to the other terminal 83 of capacitor C3.

It can be seen that each time a voltage pulse appears in conductor 95 current will flow through R14. The resultant potential at junction 97 will forward bias each of the transistors T5 and T6 so that a constant magnitude emitter and collector current will be drawn through R16 and R17 to the terminals 82 and 83 respectively of capacitor C3.

When the load voltage is in band the currents flowing to the terminals 82 and 83 of capacitor C3 from the constant current circuits 74 and 76 will be conducted to the ground bus G through switching circuits 78 and 80. Switching circuit 78 includes a NPN switching transistor T7 whose emitter is connected to the ground bus G and whose collector is connected to diode D2. In addition, a biasing resistor R18 connects the collector of T7 to a conductor 99, which is also connected to the positive terminal of full wave rectifier 88 through normally closed contacts M2 and L2, whose purpose will be discussed in greater detail hereinbelow.

A current limiting resistor R20 and isolating diodes D7 and D8 connect the base of T7 to the positive terminal 103 of a biasing resistor R21 whose other end is connected to the ground bus G. A second biasing resistor R22 connects terminal 103 to junction point 104 between a third biasing resistor R23 and a conductor 106 whose other end is connected to one side of the secondary winding S1 of transformer E1 of the voltage sensing portion 24. The other side of secondary winding S1 of transformer E1 is connected to the ground bus G by conductors 107, 108 and 109. Also disposed in conductor 106 are the normally closed contacts L3 of relay L in the lower output portion 30. The other side of resistor R23 is connected to the alternating current source 44 by conductor 110 and the automatic tap 40 of the selector switch 41.

In a similar manner, switching circuit 80 includes an NPN transistor T8 whose emitter is connected to ground bus G and whose collector is connected to D3. A current limiting resistor R24 and a pair of isolating diodes D9 and D10 connect the base of T8 to the positive terminal 112 of a first biasing resistor R25. In a similar manner also, a second biasing resistor R26 connects terminal 112 to junction point 114 between a third biasing resistor R28 and a conductor 116 whose other end is connected to one side of the secondary winding S2 of transformer E2. Also, the other side of winding S2 is connected to the ground bus G by conductors 117, 108 and 109. The other side of R28 is also connected by conductor 110 to the automatic tap 40 of selector switch 42. Leakage resistors R30 and R31 and filter capacitors C7 and C8 are also provided in the base circuits of transistors T7 and T8, respectively.

In order to reverse bias transistors T4, T7 and T8 between pulses from the full wave rectifier 88, a winding S3' is inductively coupled to winding P3 of transformer E3 and is connected at one end through isolating diode D12 to the ground bus G and its other end to resistors R32 and R34 which are connected to the bases of T7 and T8, respectively, and a resistor R35 connected to the collector of T4.

The lower output circuit 30 includes a lower load relay L for initiating the operation of the tap changer in a lower direction, a unijunction transistor U2 for sensing the potential appearing at terminal 82 and a silicon controlled rectifier SCR3 for initiating the operation of relay L.

The emitter of U2 is connected to terminal 82 through an isolating diode D14 and its base-one electrode is connected to the junction 112 between a resistor R36, whose other end is connected to ground bus G, and the gate electrode of SCR3. The base-two electrode of U2 is connected to conductor 99 through a biasing resistor R37. A second isolating diode D15 prevents current flow from terminal 82 to the gate electrode of SCR3.

In order to allow for repeated tap changing operations without waiting for capacitor C3 to completely recharge should an initial tap change not bring the system voltage to within the desired band, a sequencing capacitor C9 is connected between terminal 82 and the ground bus G. For reasons which will become more apparent hereinafter, the capacitance of C9 is much smaller than the capacitance of C3 so that it may be charged from capacitor C3 without appreciable diminution of the total charge on C3.

The raise output circuit 28 is identical to the lower output circuit 30 and includes a unijunction transistor U3 having an emitter electrode connected to terminal 83 of capacitor C3 through isolating diode D16, a base-one electrode connected by resistor R39 to the ground bus G and a base-two electrode connected by resistor R40 to conductor 99. Raise output circuit 28 also includes a silicon controlled rectifier SCR4 having a gate electrode connected to the junction 114 between R39 and the base-one electrode of U3. The anode-cathode circuit of SCR4 is connected in series with the winding of raise load relay M and the series combination is connected between the ground bus G and conductor 99. A second sequencing capacitor C10 is connected between terminal 83 of capacitor C3 of the ground bus G and an isolating diode D17 prevents current flow from terminal 83 to the gate electrode of SCR4.

The operation of the control circuit will now be discussed. With reference again to the voltage sensing circuit 24, resistors R3, R4, R5 and R6 and diode D1 are so chosen that when the voltage in the load line is in band, the potential at junction point 55 will be less negative than the potential at junction point 57 and more negative than the potential at junction point 58. Under this condition of operation the base potential of T1 will be positive relative to its emitter so that it will be nonconductive. Similarly, the base potential of T2 will be positive relative to its emitter so that this transistor will also be nonconductive.

Because neither of the transistors T1 or T2 are conductive, each of the silicon controlled rectifiers SCR1 and SCR2 will also be nonconductive so that the output terminals 66 and 67 of full wave rectifier 61 and the output terminals 69 and 70 of the full wave rectifier 65 will each be open circuited. As a result, the windings S1 of transformer E1 and S2 of transformer E2 are also open circuited.

Because the primary winding P1 of transformer E1 is open circuited, the secondary winding S1 will present a relatively high impedance between junction point 104 and the ground bus G traced through conductors 106, 107, 108 and 109. In effect, therefore, junction point 104 will be disconnected from the ground bus G so that current may flow from the alternating current source 44 through selector switch 42, conductor 110, and resistors R23, R22, and R21 to the ground bus G. As a result, the base of T7 will be sufficiently positive relative to its emitter, which is tied to the ground bus G, so that T7 will be conductive. This connects terminals 82 of capacitor C3 to the ground bus G so that the current pulses flowing in the collector of T5 will flow to ground through T7 to prevent the charging of capacitor C3 through terminal 82.

In a similar manner, the open circuiting of winding P2 will effectively open the circuit between junction 114 and the ground bus G through conductors 116, 117, 108 and 109 so that current will flow from conductor 110 through resistors R25, R26 and R28 to conductive transistor T8 and thereby prevent the charging of terminal 83 of capacitor C3 by providing a discharge path to ground.

If the load voltage should rise above the band limits, the potential at capacitor C2 terminal 54 will increase proportionally to the new value of the load voltage. The potential at junction point 55 will become more negative by an equal number of volts. When the load voltage exceeds the band limits, the resulting potential at junction point 55 will be sufficiently more negative than the potential at junction point 57 to cause transistor T1 to become conductive. As a result, trigger current will flow to the gate electrode of SCR1 which will then short circuit the output terminals 66 and 67 of full wave rectifier 61. The short circuiting of the terminals 66 and 67 of rectifier 61 constitutes a "lower" signal from the voltage sensing circuit 24.

When a short circuit appears across terminals 66 and 67 of rectifier 61, the impedance of winding S1 will be substantially reduced so that junction point 104 between resistors R22 and R23 will effectively be grounded. This will short circuit resistors R21 and R22 so that the base of transistor T7 will also be at ground potential and the transistor will no longer be forward biased. This has the effect of open circuiting the connection between terminal 82 of capacitor C3 is ground so that the current pulses flowing from the collector of transistor T5 will begin charging capacitor C3 through terminal 82. Because transistor T2 of voltage sensing circuit 24 remains reverse biased, however, winding P2 of transformer E2 will remain open circuited so that transistor T8 of the integrating circuit 26 will remain forward biased and terminal 83 of capacitor C3 will be held at ground potential. As a result, terminal 82 of capacitor C3 will begin charging positively, or in other words, capacitor C3 will being charging in a first sense.

Should the overvoltage in the load be of a transient or nonpermanent nature so that it returns to within the band limits before the desired time delay of the device, transistor T1 and SCR1 will become nonconductive to open circuit the bridge 61 and thereby open circuit winding P1 of transformer E1. This open circuits the connection between junction point 104 and ground so that biasing current can again begin flowing through resistors 21 and 22 to forward bias transistor T7 and again connect terminal 82 to ground. As a result, terminal 82 of capacitor C3 immediately goes to ground potential. However, because isolating diode D3 prevents the flow of discharge current between ground and terminal 83 of capacitor C3, the latter terminal immediately becomes negative. Terminal 83 of capacitor C3 will remain negatively charged until returned to zero potential by the current pulses flowing from the collector of T6.

It will be appreciated that because terminal 82 had been charged in a constant linear rate by periodically recurring current pulses of equal magnitude from the collector of T5 and because terminal 83 is returned to zero charge by periodically recurring current pulses of equal magnitude from the collector of T6, the charging and discharging rates of capacitor C3 will each be constant linear and equal.

Should the overvoltage in the load line be of a permanent nature, however, transistor T7 will remain nonconductive and terminal 82 of capacitor C3 will continue charging at a constant rate in a positive sense until its potential will be sufficiently high to cause emitter base-one current to flow in unijunction transistor U2. This immediately discharges capacitor C9. However, as previously explained, capacitor C3 is prevented from discharging by diodes D2, D3, D4 and D6. The resultant drop across R36 will fire SCR3 thereby completing an energizing circuit through winding L of the lower output relay.

With reference to FIG. 1, it can be seen that energizing the lower output relay L closes contacts L1 to complete an energizing circuit through the lower winding 32 of the motor 20 which initiates the operation of the tap changer 22 in a voltage lowering direction.

The energizing of the lower output relay L also opens the normally closed contacts L3 in conductor 106 to disconnect junction point 104 from ground. As a result, transistor T7 will again momentarily become forward biased to connect junction point 82 to ground.

Shortly after the tap change has commenced, holding contacts 47 mechanically coupled to the tap changer 14 will close to complete a holding circuit through the lower winding 32 of motor 20 so that the tap change may be completed regardless of what happens in the control circuit. The closing of holding contacts 47 also energizes series relay H which, in turn, opens normally closed contacts H1 between the negative terminal 90 of full wave rectifier 88 and the ground bus G thereby interrupting the circuit to the lower output relay L. This resets the relay L closing the contacts L1 to reconnect junction point 104 to the winding S1 of transformer E1.

After the tap change has been completed, holding contact 47 opens to de-energize relay H thereby closing contacts H1 and re-energizing the integrating circuit 26.

In the event that the tap change does not bring the load voltage within the band limits, the voltage sensing circuit 24 will continue to short circuit winding P1 so that the closing of contacts L1 will again ground junction point 104 and reverse bias transistor T7. Also as a result of the closing of contacts H1, charging current will again begin flowing to terminal 82 of capacitor C3 from charging circuit 74. However, as indicated above, capacitor C3 was prevented from any substantial discharging by the diodes D2 and D4 so that it is only necessary for the relatively smaller capacitor C9 to be recharged before the unijunction transistor U2 conducts emitter-base-one current to fire SCR3 and again energize relay L and initiate another tap changing operation. Thus, it can be seen that all tap changes in either direction subsequent to the first will occur after a relatively short interval compared to the time delay necessary to initiate the first tap change.

If the tap changes are sufficient to lower the system voltage to within the band limits, the potential difference between junctions 55 and 57 of the voltage sensing circuit 24 will be insufficient to maintain transistor T1 in a conductive state. As a result, SCR1 will become nonconductive to open circuit the terminals 59 and 60 of rectifier 61 thereby effectively disconnecting junction point 104 from ground. As a result, transistor T7 will again be forward biased to connect junction point 82 to ground so that it may begin discharging linearly in the manner previously described.

Should the load voltage fall below the preselected band limits, on the other hand, the potential at junction point 55 will become sufficiently less negative than the potential at junction point 58 to cause transistor T2 to begin conducting collector current to the gate of SCR2. As a result, SCR2 will begin conducting thereby short circuiting the output terminals 69 and 70 of full wave rectifier 65.

When a short circuit appears across terminals 69 and 70 of rectifier 65, indicating a voltage "raise" signal from the voltage sensing circuit 24, junction point 114 will effectively be grounded through the secondary winding S2 of transformer E2 so that transistor T8 will no longer be forward biased thereby disconnecting terminal 83 of capacitor C3 from ground. The periodic recurring current pulses of constant magnitude flowing from the collector of T6 will then begin charging terminal 83 positively. Because transistor T7 holds terminal 82 at ground potential, capacitor C3 begins charging in an opposite sense from that which occurred when switching transistor T7 became nonconductive during the voltage lower signal from voltage sensing circuit 24.

Should the load voltage remain below the band for the desired time delay the charge in capacitors C2 and C10 will become sufficient to cause emitter-base-one current to flow in unijunction transistor U3 to thereby fire SCR4 and complete the energizing circuit through the voltage raise output relay M. This closes contacts M1 (see FIG. 1) to complete the energizing circuit through the raise winding 31 of motor 20 and thereby initiate the operation of the tap changer 14 in a voltage raise direction. As the tap changer 14 begins operating it closes a raise holding contact 46 to complete a bypass holding circuit through winding 31. This also energizes relay H which opens contacts H1 to reset winding M.

Should the tap changer operate to its limit in the lower direction, for example, and the voltage still remains outside the band limits, the lower winding L will remain energized so that contacts L2 will remain open. Because there are no subsequent tap changes, however, series winding H is incapable of resetting relay L. However, should the load voltage decrease and fall below the lower band limits causing the operation of the voltage raise output relay M, contacts M2 will also open thereby momentarily disconnecting relay L from the terminal 89 so that relay L will be reset. Relay M will be reset in a similar manner should the tap changer move to its extreme position in a voltage raise direction.

While only a single embodiment is shown and described it is not intended that the instant invention be limited thereby but only by the scope of the appended claims.

I claim:

1. A voltage regulating device for maintaining the voltage in a system within predetermined limits, reversible voltage modifying means connected to said system for changing the voltage therein, an integrating capacitor having a pair of terminals, charging circuit means coupled to each of said terminals, switching circuit means connected to said charging circuit means and to said terminals and normally operable to prevent the charging of said integrating capacitor through either terminal, voltage sensing means coupled to said system and to said switching circuit means and operable when said system voltage falls below said limits to initiate the flow of substantially uniform charging current through one terminal of said capacitor to charge the same at a substantially constant rate in a first sense and operable when said system voltage rises above said limits to initiate the flow of a substantially uniform charging current through the other terminal of said capacitor to change the same at said substantially constant rate in an opposite sense, means coupled to said terminals and including said switching circuit means for discharging said integrating capacitor at a substantially constant rate in either sense when said system voltage returns to said limits, and output means coupled to said voltage modifying means and to each of said terminals and operable to initiate the operation thereof in a voltage raising direction when the charge in said capacitor reaches a predetermined value in said first sense and to initiate the operation thereof in a voltage lowering direction when the charge on said integrating capacitor reaches a predetermined value in said opposite sense.

2. A voltage regulating device for maintaining the voltage in a system within predetermined limits, a voltage transformer having an output connected to said system and tap changing means for changing the voltage therein, an integrating capacitor having a pair of terminals, a secondary capacitor shunting each of said terminals, the capacitance of each of said secondary capacitors being much smaller than that of said integrating capacitor, charging circuit means coupled to each of said terminals, leakage circuit means connected to said charging circuit means and normally operable to prevent the charging of said integrating capacitor or said secondary capacitors through either terminal, voltage sensing means coupled to said system and to said leakage circuit means and operable when said system voltage falls below said limits to initiate the flow of substantially uniform charging current through one terminal of said integrating capacitor and one of said secondary capacitors to charge at a constant rate in a first sense and operable when said system voltage rises above said limits to initiate the flow of a substantially uniform charging current through the other terminal to change said integrating capacitor and the other of said secondary capacitors at said constant rate in an opposite sense, means coupled to said terminals and including said leakage circuit means for discharging said capacitors at a substantially constant rate in either sense when said system voltage returns to said limits, and output means coupled to said tap changing means and to each of said terminals and operable to initiate the operation of said tap changing means in a voltage raising direction when the charge on one of said secondary capacitors reaches a predetermined value in said first sense and to initiate the operation thereof in a voltage lowering direction when the charge on the other of said secondary capacitors reaches a predetermined value in said opposite sense.

3. A voltage regulating device for maintaining the voltage in a system within predetermined limits, reversible voltage modifying means connected to said system for changing the voltage therein, an integrating capacitor having a pair of terminals, charging circuit means coupled to each of said terminals, leakage circuit means connected to said charging circuit means and normally operable to prevent the charging of said integrating capacitor through either terminal, voltage sensing means coupled to said system and to said leakage circuit means and operable when said system voltage falls below said limits to render said leakage circuit means ineffective relative to one of said terminals to initiate the charging of said capacitor at a substantially constant rate in a first sense through said one terminal, said voltage sensing means also being operable when said system voltage rises above said limits to render said leakage means ineffective relative to the other of said terminals to initiate the charging of said capacitor at said substantially constant rate through said other terminal, means coupled to said terminals and including said leakage circuit means for discharging said integrating capacitor at a substantially constant rate in either sense when said system voltage returns to said limits, and output means coupled to said voltage modifying means and to each of said terminals and operable to initiate the operation thereof in a voltage raising direction when the charge in said capacitor reaches a predetermined value in said first sense and to initiate the operation thereof in a voltage lowering direction when the charge on said integrating capacitor reaches a predetermined value in said opposite sense.

4. A voltage regulating device for maintaining the voltage in a system within predetermined limits, reversible voltage modifying means connected to said system for changing the voltage therein, voltage sensing means coupled to said system for producing a first electrical signal when said system voltage falls below said limits and a second electrical signal when said system voltage rises above said limits, an integrating capacitor having a pair of terminals, constant current circuit means coupled to each of said terminals, switching circuit means connected to said voltage sensing means and to said constant current circuit means and operable upon the occurrence of said first electrical signal to initiate the flow of substantially uniform charging current to one terminal of said capacitor to charge the same at a substantially constant rate in a first sense and operable upon the occurrence of said second signal to initiate the flow of a substantially uniform charging current to the other terminal of said capacitor to charge the same at said substantially constant rate in an opposite sense, means coupled to said terminals for discharging said integrating capacitor at a substantially constant rate in either sense upon the cessation of said electrical signals, and output means coupled to said voltage modifying means and to each of said terminals and operable to initiate the operation of said modifying means in a voltage raising direction when the charge in said capacitor reaches a predetermined value in said first sense and to initiate the operation of said modifying means in a voltage lowering direction when the charge on said integrating capacitor reaches a predetermined value in said opposite sense.

5. A voltage regulating device for maintaining the voltage in a system within predetermined limits, electroresponsive means connected to said system for changing the voltage therein, voltage sensing means coupled to said system for producing a first electrical signal when said system voltage falls below said limits and a second electrical signal when said system voltage rises above said limits, current integrating means having first and second terminal means, constant current circuit means coupled to each of said terminal means, switching circuit means connected to said voltage sensing means and to said constant current circuit means and operable upon the occurrence of said first electrical signal to initiate the flow of substantially uniform charging current to one terminal means of said current integrating means to charge the same at a substantially constant rate in a first sense and operable upon the occurrence of said second signal to initiate the flow of a substantially uniform charging current to the other terminal means of said current integrating means to charge the same at said substantially constant rate in an opposite sense, means coupled to said terminal means and to said voltage sensing means for discharging said current integrating means at a substantially constant rate in either sense upon the cessation of said electrical signals, and output means coupled to said electroresponsive means and to each of said terminal means and operable to initiate the operation of said electroresponsive means in a voltage raising direction when the charge in said current integrating means reaches a predetermined value in said first sense and to initiate the operation of said electroresponsive means in a voltage lowering direction when the charge on said current integrating means reaches a predetermined value in said opposite sense.

6. A voltage regulating device for maintaining the voltage in a system within predetermined limits, electroresponsive means connected to said system for changing the voltage therein, voltage sensing means coupled to said system for producing a first electrical signal when said system voltage falls below said limits and a second electrical signal when said system voltage rises above said limits, current integrating means having first and second terminals, constant current circuit means coupled to each of said terminals, first and second switching circuit means connected to said voltage sensing means and to said first and second terminals respectively for preventing the accumulation of charge thereon, said first switching circuit means being operable upon the occurrence of said first electrical signal to initiate the accumulation of charge on said first terminal to charge said current integrating means at a substantially constant rate in a first sense, said second switching circuit means being operable upon the occurrence of said second signal to initiate the accumulation of charge on said second terminal to charge said current integrating means at said rate in an opposite sense, means coupled to each of said terminals and to said voltage sensing means and including said first and second switching circuit means for discharging said current integrating means at a substantially constant rate in either sense upon the cessation of said electrical signals, and output means coupled to said electroresponsive means and to each of said terminals and operable to initiate the operation of said electroresponsive means in a voltage raising direction when the charge in said current integrating means reaches a predetermined value in said first sense and to initiate the operation of said electroresponsive means in a voltage lowering direction when the charge on said current integrating means reaches a predetermined value in said opposite sense.

7. A voltage regulating device for maintaining the voltage in a system within predetermined limits, reversible voltage modifying means coupled to said system, voltage sensing means coupled to said system for producing a first electrical signal when said system voltage falls below said limits and a second electrical signal when said system voltage rises above said limits, an integrating capacitor having first and second terminals, constant current circuit means coupled to each of said terminals, first and second switching circuit means connected to said voltage sensing means and to said first and second terminals respectively for completing grounding circuits to said terminals to prevent the accumulation of charge thereon, said first switching circuit means being operable upon the occurrence of said first electrical signal to open the grounding circuit to said first terminal and initiate the accumulation of charge thereon to charge said capacitor at a substantially constant rate in a first sense, said second switching circuit means being operable upon the occurrence of said second signal to open the grounding circuit to said second terminal and to initiate the accumulation of charge thereon to change said capacitor at said substantially constant rate in an opposite sense, means coupled to each of said terminals and to said voltage sensing means and including said first and second switching circuit means for discharging said integrating capacitor at a substantially constant rate in either sense upon the cessation of said electrical signals, and output means coupled to said voltage modifying means and to each of said terminals and operable to initiate the operation of said modifying means in a voltage raising direction when the charge in said capacitor reaches a predetermined value in said first sense and to initiate the operation thereof in a voltage lowering direction when the charge on said capacitor reaches a predetermined value in said opposite sense.

8. A voltage regulating device for maintaining the voltage in a system within predetermined limits, reversible voltage modifying means coupled to said system, voltage sensing means coupled to said system for producing a first electrical signal when said system voltage falls below said limits and a second electrical signal when said system voltage rises above said limits, an integrating capacitor having first and second terminals, constant current circuit means coupled to each of said terminals, first and second normally conductive transistor means each having an emitter-base circuit respectively coupled to said first and second terminals for completing discharging circuits thereto to prevent the accumulation of charge thereon, and a bias circuit connected to said voltage sensing means and to the base of each of said transistor means, said bias circuit being operable upon the occurrence of said first electrical signal to render said first transistor means nonconductive and initiate the accumulation of charge on said first terminal to charge said capacitor at a substantially constant rate in a first sense, said bias circuit also being operable upon the occurrence of said second signal to render said second transistor means nonconductive and initiate the accumulation of charge on said second terminal to change said capacitor at said constant rate in an opposite sense, means coupled to said terminals and to said voltage sensing means and including said first and second transistor means for discharging said integrating capacitor at a substantially constant rate in either sense upon the cessation of said electrical signals, and output means coupled to said voltage modifying means and to each of said terminals and operable to initiate the operation of said modifying means in a voltage raising direction when the charge in said capacitor reaches a predetermined value in said first sense and to initiate the operation thereof in a voltage lowering direction when the charge on said capacitor reaches a predetermined value in said opposite sense.

9. A device for maintaining the voltage in a system within predetermined limits, including reversible voltage modifying means coupled to said system, energy storage means having first and second terminals, circuit means coupled to said first and second terminals and to said system for charging said energy storage means at a substantially constant rate in a first sense through said first terminal when said system voltage rises above said limits and at said substantially constant rate in an opposite sense through said second terminal when said system voltage falls below said limits, said circuit means also being operable to initiate the discharge of said energy storage means when said voltage returns to said limits, and output means including first and second electroresponsive operators coupled to said voltage modifying means, and first and second unijunction transistors each having an emitter electrode respectively connected to said first and second terminals and a base electrode respectively connected to said first and second electroresponsive operators, said first electroresponsive operator being operable to initiate the operation of said voltage modifying means in a voltage lowering direction when the charge in said energy storage means reaches a predetermined value in said first sense to fire said first unijunction transistor and said second electroresponsive means being operative to initiate the operation of said voltage modifying means in a voltage raising direction when the charge on said energy storage means reaches a predetermined value in said opposite sense to fire said second unijunction transistor.

10. A voltage regulating device for maintaining the voltage in a system within predetermined limits, reversible voltage modifying means coupled to said system, voltage sensing circuit means coupled to said system for sensing deviations in said system voltage from said limits, integrating capacitor means having first and second terminal means, constant current circuit means coupled to said terminals, normally conductive switching circuit means coupled to said voltage sensing circuit means, unidirectional circuit means coupling said switching circuit means to said first and second terminal means to complete discharging circuits thereto, said voltage sensing circuit means being operable when said system voltage falls below said limits to actuate said switching circuit means to open the discharging circuit to said first terminal means and initiate the accumulation of charge thereon to charge said capacitor means at a substantially constant rate in a first sense, said voltage sensing circuit means also being operable when said system voltage rises above said limits to actuate said switching circuit means to open the discharging circuit to said second terminal means and initiate the accumulation of charge thereon to charge said capacitor means at said constant rate in an opposite sense, said discharging circuits being reclosed when said system voltage returns to within said limits, said switching circuit means including unidirectional circuit means for preventing reverse current flow to the previously uncharged terminal means so that current flow thereto from said constant current circuit means discharges said capacitor means at said substantially constant rate, and output means coupled to said voltage modifying means and to each of said terminal means and operable to initiate the operation of said modifying means in a voltage raising direction when the charge in said capacitor means reaches a predetermined value in said first sense and to initiate the operation thereof in a voltage lowering direction when the charge on said capacitor means reaches a predetermined value in said opposite sense.

11. A voltage regulating device for maintaining the voltage in a system within predetermined limits, reversible voltage modifying means coupled to said system, voltage sensing means coupled to said system for producing a first electrical signal when said system voltage falls below said limits and a second electrical signal when said system voltage rises above said limits, integrating capacitor means having first and second terminal means, constant current circuit means coupled to said terminals, first and second normally conductive switching circuit means coupled to said voltage sensing means, unidirectional circuit means coupling said switching circuit means to said first and second terminal means to complete discharging circuits to said terminal means, said switching circuit means being operable upon the occurrence of said first electrical signal to open circuit the discharging circuit to said first terminal means and initiate the accumulation of charge thereon so that said capacitor means is charged at a substantially constant rate in a first sense, said switching circuit means also being operable upon the occurrence of said second signal to open circuit the discharging circuit to said second terminal means and initiate the accumulation of charge thereon so that said capacitor means is charged at said substantially constant rate in an opposite sense, said switching circuit means completing said discharging circuits to said terminal means upon the disappearance of their respective electrical signals, said unidirectional circuit means preventing reverse current flow to the previously uncharged terminal means so that current flow thereto from said constant current circuit means discharges said capacitor means at said substantially constant rate, and output means coupled to said voltage modifying means and to each of said terminal means and operable to initiate the operation of said modifying means in a voltage raising direction when the charge in said capacitor means reaches a predetermined value in said first sense and to initiate the operation thereof in a voltage lowering direction when the charge on said capacitor means reaches a predetermined value in said opposite sense.

12. A voltage regulating device for maintaining the voltage in a system within predetermined limits, reversible voltage modifying means coupled to said system, voltage sensing means coupled to said system for producing a first electrical signal when said system voltage falls below said limits and a second electrical signal when said system voltage rises above said limits, an integrating capacitor having first and second terminals, constant current circuit means, first unidirectional circuit means coupling said constant current circuit means to each of said terminals, first and second normally conductive electronic circuit elements each having a pair of output terminals and a control terminal, second unidirectional circuit means coupling said output terminals to said first and second capacitor terminals to complete a discharging circuit thereto, a bias circuit means connected to said voltage sensing circuit means and to each of the control terminals of said elements, said bias circuit means being operable upon the occurrence of said first electrical signal to render said first element nonconductive and initiate the accumulation of charge on said first terminal to charge said capacitor at a substantially constant rate in a first sense, said bias circuit means also being operable upon the occurrence of said second signal to render said second element nonconductive and initiate the accumulation of charge on said second terminal to change said capacitor at said constant rate in an opposite sense, said bias circuit means rendering said first and second electronic circuit elements conductive upon the disappearance of their respective electrical signals, said first and second unidirectional current means preventing reverse current flow to the previously uncharged terminal of said capacitor so that current flow thereto from said constant current circuit means discharges said capacitor at said substantially constant rate, and output means coupled to said voltage modifying means and to each of said terminals and operable to initiate the operation of said modifying means in a voltage raising direction when the charge in said capacitor reaches a predetermined value in said first sense and to initiate the operation thereof in a voltage lowering direction when the charge on said capacitor reaches a predetermined value in said opposite sense.

13. A voltage regulating device for maintaining the voltage in a system within predetermined limits, reversible voltage modifying means coupled to said system, voltage sensing means coupled to said system for producing a first electrical signal when said system voltage falls below said limits and a second electrical signal when said system voltage rises above said limits, an integrating capacitor having first and second terminals, constant current circuit means, first unidirectional circuit means coupling said constant current circuit means to each of said terminals, first and second normally conductive electronic circuit elements each having a pair of output terminals and a control terminal, second unidirectional circuit means coupling one output terminal of each of said elements to said first and second capacitor terminals to complete a discharging circuit thereto, bias circuit means connected to said voltage sensing circuit means and to each of the control terminals of said elements, said bias circuit means being operable upon the occurrence of said first electrical signal to render said first element nonconductive and initiate the accumulation of charge on said first terminal to charge said capacitor at a substantially constant rate in a first sense, said bias circuit means also being operable upon the occurrence of said second signal to render said second element nonconductive and initiate the accumulation of charge on said second terminal to charge said capacitor at said constant rate in an opposite sense, said bias circuit means rendering said first and second elements conductive upon the disappearance of their respective electrical signals, said first and second unidirectional circuit means preventing the completion of a discharging circuit between said first and second terminals so that said capacitor is discharged at a constant rate from said constant current circuit means supplying charge to the previously uncharged terminal thereof, and output means coupled to said voltage modifying means and to each of said terminals and operable to initiate the operation of said modifying means in a voltage raising direction when the charge in said capacitor reaches a predetermined value in said first sense and to initiate the operation thereof in a voltage lowering direction when the charge on said capacitor reaches a predetermined value in said opposite sense.

14. A voltage regulating device for maintaining the voltage in a system within predetermined limits, reversible voltage modifying means connected to said system for changing the voltage therein, current integrating means having first and second inputs, charging circuit means coupled to each of said inputs, bi-stable circuit means connected to said charging circuit means and to each of said terminals and normally operable to prevent the charging of said integrating circuit means through either of said inputs, voltage sensing means coupled to said system and to said bi-stable circuit means and operable when said system voltage falls below said limits to render said bi-stable circuit means inoperative to prevent the charging of said current integrating means at a substantially constant rate in a first sense through one of said inputs and operable when said system voltage rises above said limits to render said bi-stable circuit means inoperative to prevent the charging of said current integrating means at a substantially constant rate in an opposite sense through the other of said inputs, means coupled to said inputs and to said bi-stable circuit means for discharging said current integrating means at a substantially constant rate in either sense when said system voltage returns to said limits, and output means coupled to said voltage modifying means and to said current integrating means and operable to initiate the operation of said output means in a voltage raising direction when the charge on said current integrating means reaches a predetermined value in a first sense and to initiate the operation thereof in a voltage lowering direction when the charge on said current integrating means reaches a predetermined value in said opposite sense.

15. A voltage regulating device for maintaining the voltage in a system within predetermined limits, reversible voltage modifying means connected to said system for changing the voltage therein, current integrating means having first and second inputs, circuit means coupled to said first and second inputs and operable when said system voltage falls below said limits to initiate the flow of substantially uniform charging current through one input of said current integrating means to charge the same at a substantially constant rate in a first sense and operable when said system voltage rises above said limits to initiate the flow of substantially uniform charging current through the other input of said current integrating means to charge the same at a substantially constant rate in an opposite sense, means coupled to said inputs and to said system for discharging said current integrating means at a substantially constant rate in either sense when said system voltage returns to said limits, and output means coupled to said voltage modifying means and to said inputs and operable to initiate the operation of said output means in a voltage raising direction when the charge on said current integrating means reaches a predetermined value in a first sense, and to initiate the operation thereof and in a voltage lowering direction when the charge on said current integrating means reaches a predetermined value in the opposite sense.

16. A voltage regulating device for maintaining the voltage in a system within predetermined limits, reversible voltage modifying means connected to said system for changing the voltage therein, current integrating means having first and second inputs, uniform current supply means coupled to said first and second inputs, voltage responsive circuit means coupled to said system and to said current supply means and operable when said system voltage falls below said limits to initiate the flow of substantially uniform charging current from current supply means through one input of said current integrating means to charge the same at a substantially constant rate in a first sense and operable when said system voltage rises above said limits to initiate the flow of substantially uniform charging current from said current supply means through the other input of said current integrating means to charge the same at a substantially constant rate in an opposite sense, said voltage responsive circuit means being operable to initiate the discharging of said current integrating means at a substantially constant rate in either sense when said system voltage returns to within said limits, and output means coupled to said voltage modifying means and to said first and second inputs and operable to initiate the operation of said modifying means in a voltage raising direction when the charge on said current integrating means reaches a predetermined value in a first sense and to initiate the operation thereof in a voltage lowering direction when the charge on said current integrating means reaches a predetermined value in the opposite sense.

17. A voltage regulating device for maintaining the voltage in a system within predetermined limits, reversible voltage modifying means connected to said system for changing the voltage therein, capacitance means having first and second inputs, first circuit means coupled to said first and second inputs for supplying uniform charging current thereto, second circuit means coupled to said inputs and normally being operative to prevent the charging of said capacitance means by said charging current, voltage responsive circuit means coupled to said system and to said second circuit means and operable when said system voltage falls below said limits to render said second circuit means inoperative relative to one of said inputs to charge said capacitance means at a substantially constant rate in a first sense and operable when said system voltage rises above said limits to render said second circuit means inoperative relative to the other of said inputs to charge said capacitance means at a substantially constant rate in an opposite sense, said voltage responsive circuit means also being operative to actuate said second circuit means for the discharging of said capacitance means at a substantially constant rate in either sense when said system voltage returns within said limits, and output means coupled to said voltage modifying means and to said inputs and operable to initiate the operation of said modifying means in a voltage raising direction when the charge on said capacitance means reaches a predetermined value in a first sense, and to initiate the operation thereof in a voltage lowering direction when the charge on said capacitance means reaches a predetermined value in the opposite sense.

References Cited by the Examiner

UNITED STATES PATENTS

| | | | |
|---|---|---|---|
| 2,619,630 | 11/1952 | Stone | 323—43.5 X |
| 2,619,631 | 11/1952 | Hamilton et al. | 323—47 |
| 2,752,556 | 6/1956 | Webb et al. | 323—43.5 |
| 2,913,657 | 11/1959 | Erickson | 323—43.5 |
| 3,026,470 | 3/1962 | Webb | 323—43.5 |
| 3,040,239 | 6/1962 | Walker | 323—43.5 |
| 3,123,762 | 3/1964 | Throop | 323—22 |
| 3,123,763 | 3/1964 | Kettler | 323—22 |

LLOYD McCOLLUM, *Primary Examiner.*